(12) United States Patent
Deker

(10) Patent No.: US 7,774,131 B2
(45) Date of Patent: Aug. 10, 2010

(54) AIRCRAFT NAVIGATIONAL ASSISTANCE METHOD AND CORRESPONDING DEVICE

(75) Inventor: Guy Deker, Cugnaux (FR)

(73) Assignee: Thales (FR)

( * ) Notice: Subject to any disclaimer, the term of this patent is extended or adjusted under 35 U.S.C. 154(b) by 1070 days.

(21) Appl. No.: 10/529,787

(22) PCT Filed: Sep. 23, 2003

(86) PCT No.: PCT/FR03/02794

§ 371 (c)(1),
(2), (4) Date: Mar. 30, 2005

(87) PCT Pub. No.: WO2004/031879

PCT Pub. Date: Apr. 15, 2004

(65) Prior Publication Data
US 2005/0283306 A1 Dec. 22, 2005

(30) Foreign Application Priority Data
Oct. 1, 2002 (FR) .................................. 02 12134

(51) Int. Cl.
*G01C 21/00* (2006.01)
*G05D 1/08* (2006.01)
*G06F 19/00* (2006.01)
*G06G 7/70* (2006.01)

(52) U.S. Cl. .................. 701/200; 701/58; 701/11; 701/17; 701/18; 701/4; 244/186; 244/180; 244/183

(58) Field of Classification Search .............. 701/5, 701/11, 17, 18, 16, 8, 4; 244/186, 180, 183
See application file for complete search history.

(56) References Cited

U.S. PATENT DOCUMENTS

| 3,892,373 | A |   | 7/1975 | Doniger |
| 4,377,848 | A |   | 3/1983 | Flannigan et al. |
| 4,609,988 | A |   | 9/1986 | Zweifel |
| 5,079,711 | A | * | 1/1992 | Lambregts et al. .............. 701/3 |

FOREIGN PATENT DOCUMENTS

FR 2371006 6/1978

* cited by examiner

*Primary Examiner*—Khoi Tran
*Assistant Examiner*—Nicholas Kiswanto
(74) *Attorney, Agent, or Firm*—Lowe Hauptman Ham & Berner, LLP

(57) ABSTRACT

The invention relates to a method of automatic navigation assistance for an aircraft. A capture zone being a zone in which the aircraft can capture a predetermined vertical profile segment by applying a transition between the guidance submode which the aircraft is in and the guidance submode adapted to the following of the vertical profile segment to be captured, it comprises the step consisting in determining the width of the capture zone as a function of the height h of the vertical profile to be captured and of the speed v which the aircraft has when plumb with this height when the aircraft is not on the profile or at this height when the aircraft is on the profile.

4 Claims, 2 Drawing Sheets

AIRCRAFT NAVIGATIONAL ASSISTANCE METHOD AND CORRESPONDING DEVICE

CROSS-REFERENCE TO RELATED APPLICATIONS

The present Application is based on International Application No. PCT/FR2003/002794, filed on Sep. 23, 2003, which in turn corresponds to FR 02/12134 filed on Oct. 1, 2002, and priority is hereby claimed under 35 USC §119 based on these applications. Each of these applications are hereby incorporated by reference in their entirety into the present application.

FIELD OF THE INVENTION

The invention relates to a method and a device for assisting navigation.

BACKGROUND OF THE INVENTION

The field of the invention is that of assistance with aerial navigation and aerial safety and relates more particularly to assistance with the monitoring of the guidance of an aircraft along a trajectory within the framework of automatic flight control.

It may involve a descent trajectory or climb trajectory. In what follows, a descent trajectory will be taken as an exemplary trajectory, and an airplane will be taken as an exemplary aircraft. Such a trajectory 1 represented in FIG. 1 and called the vertical profile consists of a succession of rectilinear segments and is decomposed into two parts: a first part 10 during which the airplane is relatively free and which may therefore be optimized by adopting a preset speed and a thrust making it possible to minimize the consumption of fuel and a second part 11 for preparing the airplane for approach and for landing on a runway 12 during which the airplane must comply with certain parameters relating to altitude, speed and horizontal course by adopting a constrained speed and a constrained slope.

An airplane descent trajectory is computed in reverse starting from the configuration of the airplane on landing, then by backtracking and by establishing from point 2 to point 2 the corresponding speed preset and thrust preset until the point at which the descent begins or "TOD", the acronym standing for "Top of Descent".

Once this profile has been established by the flight management system (FMS) on the basis of constraints given by the air traffic controllers, the flight management system will give orders to the automatic pilot to join up with this profile and hold there, these orders being established as a function of control laws and of speed and thrust presets specific to the profile segment.

A distinction is made between the laws which determine the control of the elevators as a function of presets for speed (SPD), for vertical path (VPATH) or for vertical speed (VS) and the laws which determine the control of thrust and which are established as a function of presets for thrust (THR) or for speed (SPD). These laws are combined together and the resulting pairs of laws associated with guidance submodes, make it possible to establish the orders which will allow the aircraft to join up with (or stated otherwise capture) the profile segment or to hold there while complying with certain constraints.

From the above, the zone in which it is possible to capture the profile by applying a transition between the guidance submode which the airplane is in and the guidance submode adapted to the following of the profile segment to be captured is designated as the zone of capture about the profile. Outside of this zone a guidance submode making it possible to join up with this capture zone as quickly as possible is applied.

This capture zone 3 represented in FIG. 2 may be defined as a band of diameter D, fixed or depending only on the speed, centered on the profile 1.

However these definitions take no account of the differences in particular between a flight at high altitude and high ground speed (at the start of a descent for example) and a flight at low altitude and low ground speed (during for example the preparation for the approach procedure), as well as the corollaries such as flights at low altitude and high ground speed.

Thus for a flight at high altitude and/or at high speed, the capture zone is too restricted and the capture of the intended profile segment is too fast in particular for the comfort of the passengers; likewise for a flight at low altitude and/or at low speed, the capture zone is too wide and the capture of the intended profile segment is too lengthy in the sense that part of this capture time could have been devoted to another mode of flight and in particular to a faster capture with a more fuel-economical mode of flight such as for example the "airmass" mode.

Finally, the execution of the orders by the automatic pilot do not always make it possible to ensure the comfort of the passengers or to adopt a suitable mode of flight, during the capture of the profile.

It is known that, in order to ensure the comfort of the passengers, the movements of the aircraft must not lead to the vertical acceleration factor exceeding a certain threshold, for example equal to 0.1 g, g being the terrestrial acceleration ($g=9.81$ m/s$^2$=32.1725 ft/s$^2$). This factor must not be exceeded during capture either.

As a result, in order to ensure the comfort of the passengers, it is necessary to force the capture of the profile through trajectories subject to constrained load factors. The shape of the trajectory making it possible to preserve a constant vertical acceleration factor during capture is a parabola tangential to the profile.

To ensure the comfort of the passengers, it is also necessary to avoid big variations in thrust.

An important aim of the invention is therefore to choose a capture zone that is better adapted to the comfort of the passengers and to fastness of capture than in the prior art.

SUMMARY OF THE INVENTION

To achieve these aims, the invention proposes a method of automatic navigation assistance for an aircraft, principally characterized in that a capture zone being a zone in which the aircraft can capture a predetermined vertical profile segment by applying a transition between the guidance submode which the aircraft is in and the guidance submode adapted to the following of the vertical profile segment to be captured, it comprises the step consisting in determining the width of the capture zone as a function of the height of the vertical profile to be captured and of the speed which the aircraft has when plumb with this height when the aircraft is not on the profile or at this height when the aircraft is on the profile.

A subject of the invention is also a device for automatic navigation assistance for an aircraft comprising at least one program memory, characterized in that the program memory comprises a program for computing the width of a capture zone, a capture zone being a zone in which the aircraft can capture a predetermined vertical profile segment by applying a transition between the guidance submode which the aircraft is in and the guidance submode adapted to the following of the profile segment to be captured, the width of the capture zone being calculated as a function of the height of the vertical profile to be captured and of the speed which the aircraft has when plumb with this height when the aircraft is not on the profile or at this height when the aircraft is on the profile.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other characteristics and advantages of the invention will become apparent on reading the detailed description which follows, given by way of non limiting example and with reference to the appended drawings in which.

DETAILED DESCRIPTION OF THE INVENTION

The problem posed is to determine the capture zone and more precisely to determine it in an optimal manner as a function of the dynamics of the airplane and of the comfort of the passengers.

More precisely, this involves determining this capture zone in such a way that it is wider for a flight at high altitude and/or high speed and less wide for a flight at low altitude and/or at low speed.

The method according to the invention is based on the computation of the width of the capture zone also referred to as the margin, as a function of the height of the vertical profile to be captured and of the ground speed that the airplane has when plumb with this height when the aircraft is not on the profile or at this height when the aircraft is on the profile.

According to a particular embodiment of the invention, this function is determined from the law regarding the total mechanical energy, such that $E_t = E_c + E_p$.

$E_t$, $E_c$ and $E_p$ respectively being the total energy, the kinetic energy and the potential energy of the airplane.

Figure 1:
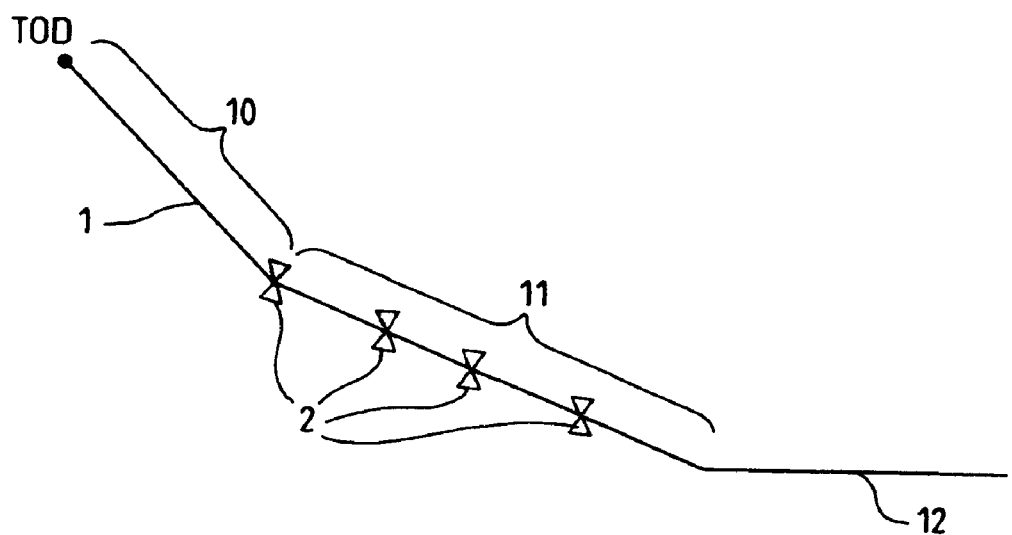
FIG. 1 already described diagrammatically represents a vertical profile.
Figure 2:
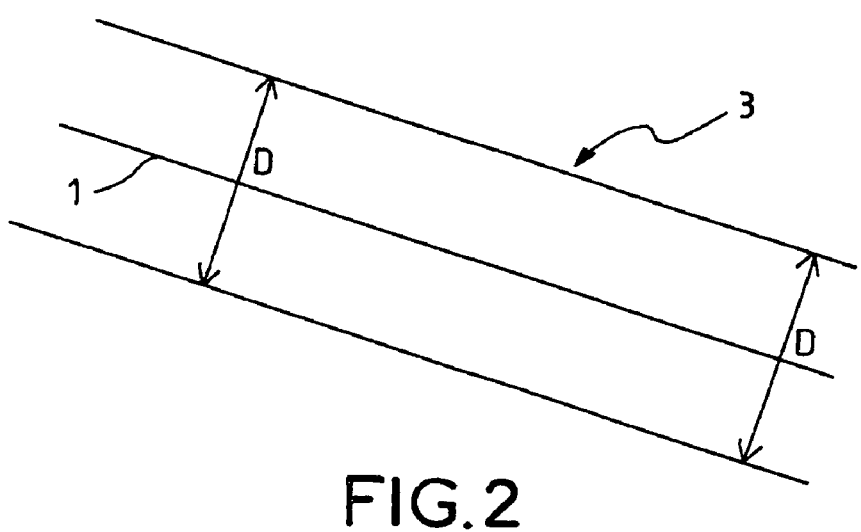
FIG. 2 already described diagrammatically represents a capture zone according to the state of the art, FIG. 3 diagrammatically represents a capture zone according to the invention, FIG. 4 diagrammatically represents a device for assisting navigation according to the invention.
Figure 3:
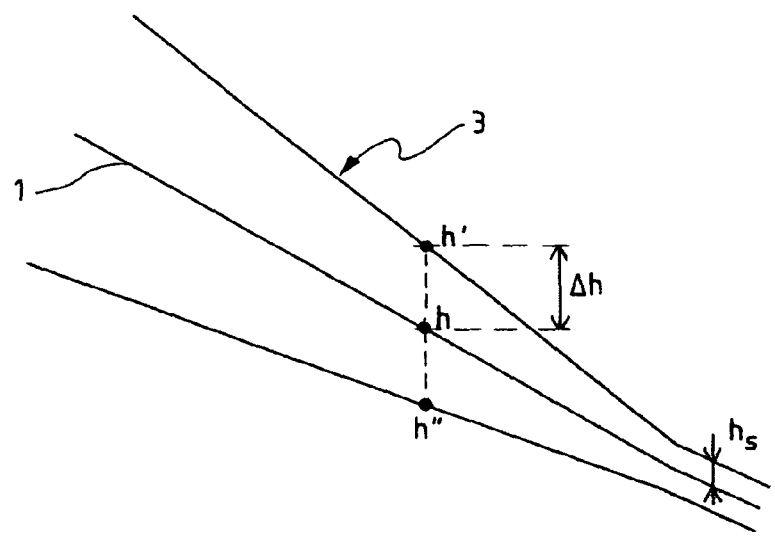

As represented in FIG. 3, by designating the ground speed that the airplane has on the profile at the height h or plumb with this height by v, its mass by m, the height of the upper bound of the capture zone by h' and the height of the lower bound by h", and by defining the equivalent total height $h_t$ arising from the total energy, we put:

$$E_t = mgh_t = \frac{1}{2}mv^2 + mgh,$$

-continued i.e. $h_t = \frac{v^2}{2g} + h$

According to an embodiment of the invention, the margin is then expressed according to a function of the total height by considering a safety height $h_s$ and an adaptation constant K varying according to the characteristics of the airplane:

$$\Delta h = h' - h = h - h'' = h_s + \frac{1}{K}h_t = h_s + \left[h + \frac{v^2}{2g}\right]\frac{1}{K}$$

K allows $\Delta h$ to vary between $h_s$, for a flight at low altitude and low speed, and a limit height for a flight at high altitude and high speed, regardless of the ground speed v and the height h.

Figure 4:
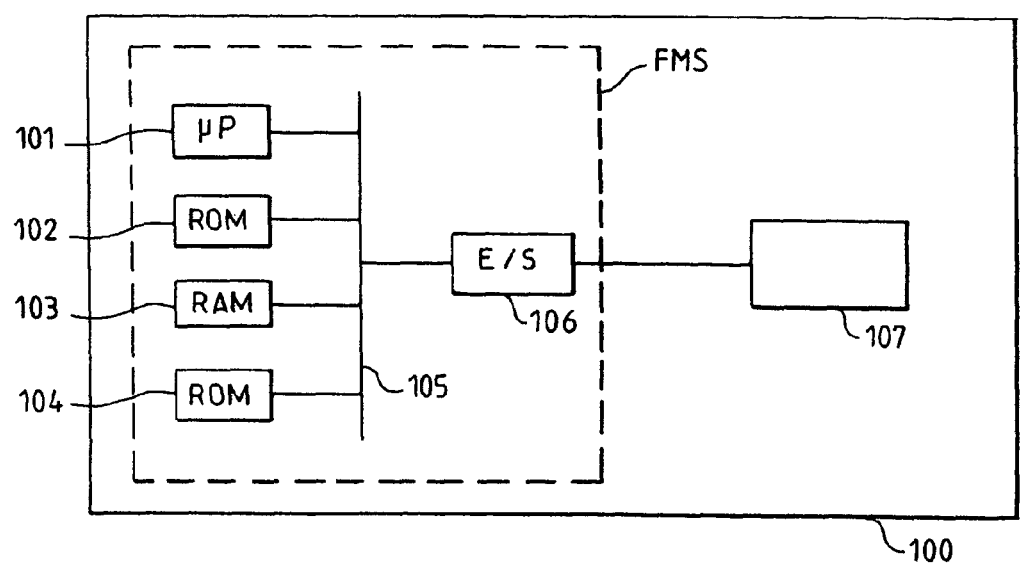

The method described is implemented in an onboard device for assisting the navigation of an aircraft. An example of this device 100 is represented in FIG. 4. It comprises in a conventional manner one or more microprocessors 101 coupled to a program memory 102 of ROM type for example, to a work memory 103 of RAM type for example and to one or more memories 104 of ROM type for example for the storage of the vertical profile to be captured, as well as circuits 105 for transferring data between these various elements. The program memory 102 contains the program that runs the method, in the form of source code, whereas the work memory 103 comprises registers that can be updated for the storage of the results of the computations. This equipment 100 also comprises a communication interface 106 for allowing the exchange of data with devices such as for example with a user interface 107, with sensors, etc.

These elements are for example included in a flight management system (FMS). They may also be included in the form of dedicated integrated circuits, designed to implement the method.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of automatic navigation assistance for an aircraft, comprising the steps of:
using a device having a program memory which contains a program executable for:
capturing a predetermined vertical profile segment in a capture zone;
applying a transition between a first guidance submode which the aircraft is in, and a second guidance submode adapted to follow the vertical profile segment which is captured; and
determining a width of the capture zone as a function of the height h of the vertical profile segment and of the speed v of the aircraft when plumb with this vertical profile segment and when the aircraft is not on the vertical profile segment, and at this height when the aircraft is on the vertical profile segment, and wherein the width of the capture zone is determined as a function of the height h and of the square of the speed v.

2. The method as claimed in claim 1, wherein the width of the capture zone is equal to around $2\Delta h$ with $$\Delta h = h' - h = h_s + \left[h + \frac{v^2}{2g}\right]\frac{1}{K}$$

h' being the height of the upper bound of the capture zone, $h_s$ a safety height, g the terrestrial acceleration and K an adaptation constant.

3. A device for automatic navigation assistance for an aircraft having a program memory, comprising:

the program memory has a program for computing the width of a capture zone, the capture zone being a zone in which the aircraft can capture a predetermined vertical profile segment by applying a transition between a first guidance submode which the aircraft is currently in and a second guidance submode adapted to follow the vertical profile segment to be captured, a width of the capture zone being calculated as a function of a height h of the vertical profile segment to be captured and of a speed v of the aircraft when plumb with the height h when the aircraft is not on the vertical profile segment and at the height h when the aircraft is on the vertical profile segment, and wherein the program memory includes a program for computing the width of a capture zone as a function of the height h and of the square of the speed v.

4. The device as claimed in claim 3, wherein the width of the capture zone is equal to around $2\Delta h$ with $$\Delta h = h' - h = h_s + \left[h + \frac{v^2}{2g}\right]\frac{1}{K}$$

h' being the height of the upper bound of the capture zone, $h_s$ a safety height, g the terrestrial acceleration and K an adaptation constant.

* * * * *